United States Patent [19]

Bernstein

[11] Patent Number: 5,010,410

[45] Date of Patent: Apr. 23, 1991

[54] METHOD AND APPARATUS FOR SIGNAL COMPANDING

[75] Inventor: Lawrence J. Bernstein, Honeoye Falls, N.Y.

[73] Assignee: Eastman Kodak Company, Rochester, N.Y.

[21] Appl. No.: 422,348

[22] Filed: Oct. 16, 1989

[51] Int. Cl.$^5$ .................... H04N 3/36; H04N 5/253
[52] U.S. Cl. .................... 358/214; 358/36; 358/167; 358/54; 381/106; 333/14
[58] Field of Search ............ 358/214, 76, 54, 213.16, 358/164, 184, 32, 36, 167, 215, 216, 133; 307/264, 490, 492, 493; 328/145; 333/14; 381/106; 330/279, 280

[56] References Cited

U.S. PATENT DOCUMENTS

| | | | |
|---|---|---|---|
| 3,886,541 | 5/1975 | Watson et al. | 340/347 AD |
| 4,281,295 | 7/1981 | Nishimura et al. | 333/14 |
| 4,366,440 | 12/1982 | Olson et al. | 330/11 |
| 4,418,358 | 11/1983 | Poetsch et al. | 358/80 |
| 4,529,966 | 7/1985 | Burroughs | 340/347 CC |
| 4,625,197 | 11/1986 | Holmes | 340/347 AD |
| 4,696,044 | 9/1987 | Waller, Jr. | 381/106 |
| 4,714,844 | 12/1987 | Muto | 307/494 |
| 4,786,970 | 11/1988 | Moore | 358/184 |
| 4,797,744 | 1/1989 | Klemmer et al. | 358/164 |
| 4,802,107 | 1/1989 | Yamamoto et al. | 364/525 |
| 4,833,532 | 5/1989 | Abe | 358/80 |

OTHER PUBLICATIONS

Dieter Poetsch, "A Digital CCD Telecine for HDTV", presented at the International TV Symposium in Montreux, Switzerland, Jun. 1989.

Primary Examiner—Tommy P. Chin
Assistant Examiner—Safet Metjahic
Attorney, Agent, or Firm—Parkhurst, Wendel & Rossi

[57] ABSTRACT

A method and apparatus for signal companding is disclosed that incorporates a log-offset companding technique to provide both a high bandwidth over the dynamic range of the signal being processed as well as temperature stability. In addition, the incorporation of log-offset companding technique provides the capability of generating a family of transfer curves. The ability to provide a family of transfer curves is particularly useful, for example, in telecine machines adapted to scan more that one type of film.

6 Claims, 8 Drawing Sheets

METHOD AND APPARATUS FOR SIGNAL COMPANDING

BACKGROUND OF THE INVENTION

The present invention relates in general to a method and apparatus for accomplishing signal companding. In particular, the present invention is directed to a method and apparatus that employs log-offset compression to accomplish signal companding. The invention is particularly useful in video signal processing circuitry for HDTV Telecine machines, video cameras and the like.

Telecine machines are devices which are used to convert images present on motion picture film to a video image signal. One of the most popular type of telecine machine employs CCD line scanners and digital signal processing techniques to scan and convert the film image. The popularity of telecine machines employing CCD scanners and digital signal processing is due in part to the high reliability attributable to the CCD devices and the high picture quality which can be obtained through the use of digital signal processing techniques.

The application of CCD line scanners to HDTV telecine machines, however, present special problems due to the substantially higher signal bandwidth required by HDTV systems. For example, CCD telecine machines typically employ one or more CCD sensors featuring an imaging array of 1728 and 2048 pixels and requiring clock rates in excess of 50 MHz. Unfortunately, the digitization of a video signal having the high bandwidth signal and dynamic range associated with HDTV requires analog-to-digital (A/D) converters beyond the capability of those currently available. Current state of the art monolithic A/D converters, however, are limited to an operating range of about a nine bit resolutions sampling at 30 Msamp/sec.; far below what is needed in the implementation of a digital CCD telecine machine. Higher resolution capability is therefore required in order to reduce the effects of quantization noise at low signal amplitudes.

Signal companding can be employed to overcome the quantization limitations of currently available A/D converters. Signal companding prior to digitizing permits the quantization steps to be tapered to provide a uniform signal to noise (S/N) ratio over a larger dynamic range than would be possible if the signal were not compressed. An example of such quantizing "pre-correction" is mentioned, for example, in a paper entitled "Digital CCD Telecine for HDTV" by Dieter Poetsch, which was presented at the International TV Symposium in Montreux, Switzerland, June 1989.

Logarithmic amplifiers are commonly used in video systems for scanning film and in many applications where a large dynamic range is required. There are disadvantages, however, associated with the use of logarithmic amplifiers in signal companding circuits for HDTV telecine machines. Logarithmic amplifiers are extremely sensitive to thermal changes at low signal levels and thus require a stable temperature environment or a temperature compensation network. To some extent, temperature problems associated with logarithmic amplifiers have been compensated for by keeping the logging transistor in thermal equilibrium using a black feedback clamp to adjust the logging transistor's current to zero during the black reference period of the video signal. In addition to temperature sensitivity, however, logarithmic amplifiers also commonly have bandwidth or settling time problems at low signal levels.

The problems associated with logarithmic amplifiers at low signal levels is particularly detrimental when attempting signal companding in telecine machines that scan print film. Print film has a higher density and a larger dynamic range than negative film making it more difficult to provide the bandwidth required (on the order of three decades) and to maintain the log transfer function due to temperature instabilities.

Accordingly, it would be desirable to develop a method and apparatus for signal companding that provides a high bandwidth over the dynamic range of the signal as well as temperature stability. Further, it would be desirable to develop a method and apparatus for signal companding that could be adjusted to provide different transfer curves based on the type of film being scanned.

SUMMARY OF THE INVENTION

The invention provides a method and apparatus for signal companding that incorporates a log-offset companding technique to provide both a high bandwidth over the dynamic range of the signal being processed as well as temperature stability. In addition, the incorporation of log-offset companding technique provides the capability of generating a family of transfer curves. The ability to provide a family of transfer curves is particularly useful, for example, in telecine machines adapted to scan more that one type of film.

In particular, the present invention provides a log-offset compandor that includes a summing circuit, a logarithmic amplifier coupled to the summing circuit and a feedback circuit coupled to the output of the logarithmic amplifier and said summing circuit, wherein the feedback circuit includes a compression ratio adjustment circuit and generates an offset signal circuit, based on the output of said logarithmic amplifier and a reference signal supplied by the compression ratio adjustment circuit, which is supplied to the summing circuit.

BRIEF DESCRIPTION OF THE DRAWINGS

With the above as background, reference should now be made to the following description of the preferred embodiment described below in conjunction with the figures wherein.

DETAILED DESCRIPTION OF THE PREFERRED EMBODIMENT(S)

A general description of log-offset compression will be provided before the actual discussion of the preferred embodiment.

Figure 1:
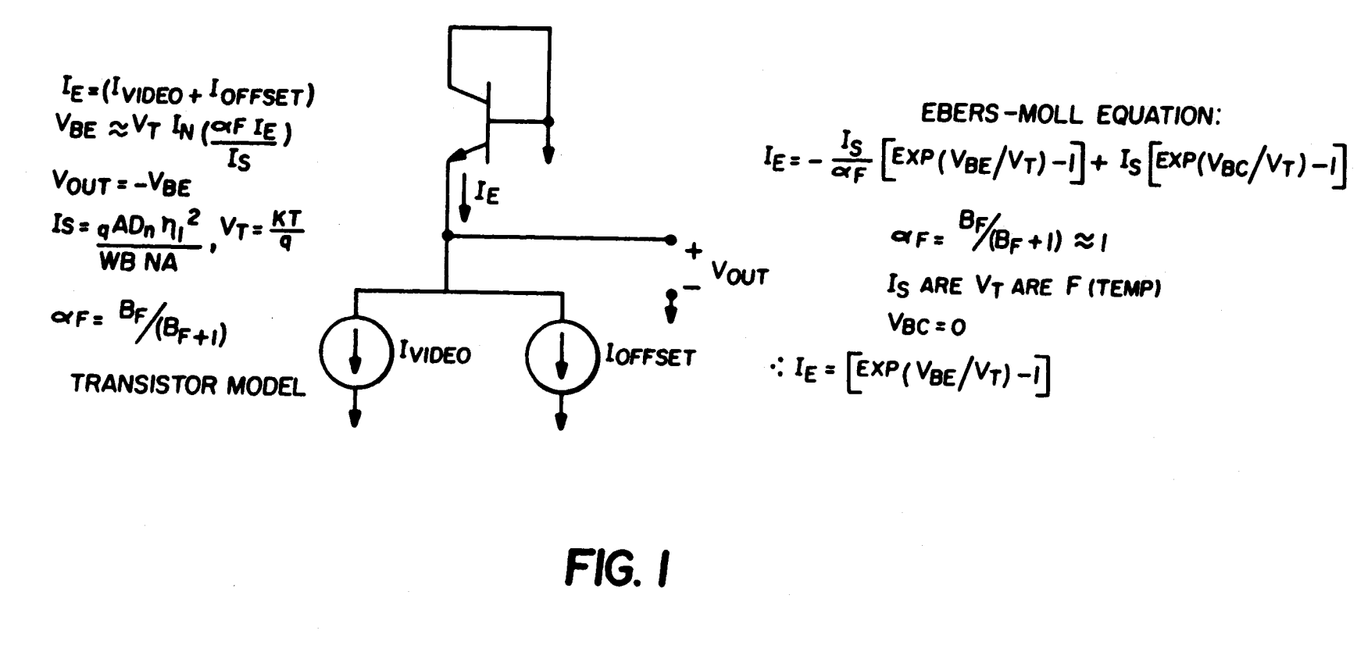
FIG. 1 illustrates a transistor model along with the Ebers Moll and transistor equations that define its operation.

The log-offset compression technique is actually a generalization of a logarithmic amplifier, which uses a black feedback clamp stabilization network, in which a signal dependent current is sinked or sourced into a collector or emitter of a bipolar junction transistor and the resultant voltage on the base emitter junction is sensed. Since the relationship between the collector or emitter current and the base-emitter voltage is logarithmic, a logarithmic output voltage results if the transistor current is directly related to the information signal. FIG. 1 illustrates a transistor model along with the Ebers Moll and transistor equations that define the above logarithmic operation.

The Ebers Moll equation has two temperature dependent terms (Is and Vt). Thus, the logging transistor must be kept in thermal equilibrium. This is usually accomplished by either a temperature stabilizer (component oven), transistor heater circuit or a temperature compensation network. A black feedback clamp network is used to adjust the logging transistor's current to substantially zero during the black reference period of the video signal. The feedback network will then maintain logarithmic calibration even when operating conditions occur outside the feedback loop change. The mathematical equation representing the log amplifier transfer curve can be expressed as:

$$Vout = K1 * Log(lin) - K2 \quad (Eq. 1)$$

where K1 is equal to the log amp scale factor (volts/decade) and K2 is equal to the output dc offset (volts).

Log-offset compression is similar to logarithmic compression set forth above except that the transistor current is adjusted to a predetermined reference level to generate a desired transfer curve. In a preferred embodiment, the transistor current is adjusted during the black reference period of a video signal. This changes the overall dynamic range of the transistor current, thereby causing the logging transistor to operate over a narrower current range. A family of different transfer curves can be generated by varying the black reference current level. The mathematical equation representing the offset log transfer curve can be expressed as:

$$Vout = K3 * Log(lin + Offset) - K4 \quad (Eq. 2)$$

where K3 is equal to the log offset scale factor (volts/decade), K4 is equal to the output dc offset (volts) and Offset is equal to the black level current (% of fullscale).

Figure 2:
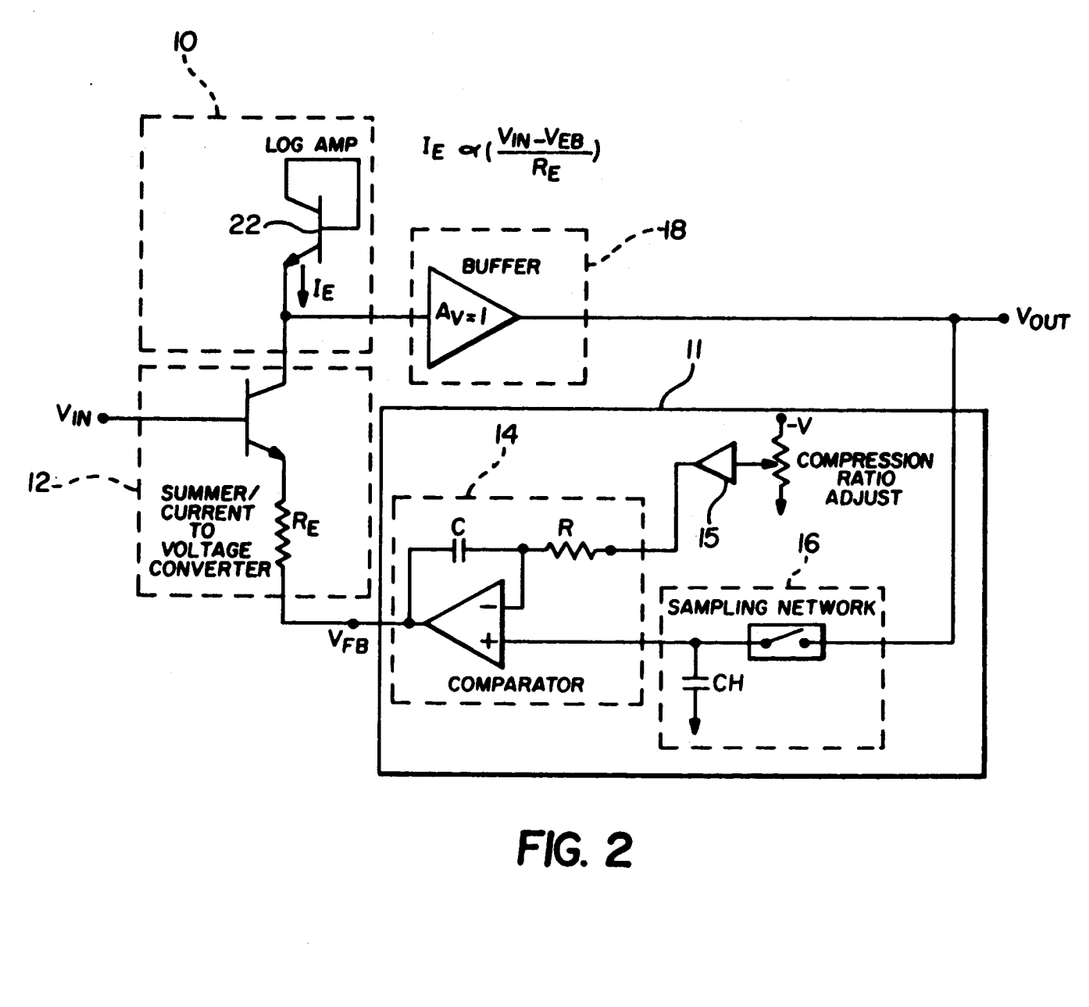
FIG. 2 is a block diagram of a log-offset compandor in accordance with the present invention.

With the above as background, reference should now be made to FIG. 2 for a more detailed discussion of a preferred embodiment of the invention. FIG. 2 illustrates a log-offset companding circuit that includes a logarithmic amplifier 10, a summing circuit 12, a feedback circuit 11 (that includes an integrator circuit 14, a compression ratio adjustment circuit 15, a sampling network 16) and an output buffer 18. A video input signal (Vin) is supplied to the summing circuit 12 along with an offset signal (Vfb) that is supplied from the feedback circuit 11. The logarithmic amplifier 10 includes a bipolar logging transistor 22 that is employed to obtain an output signal Vout that is representative of a logarithmic transfer curve.

In order to generate the offset signal, the compression ratio adjustment circuit 15 is set to a desired level. The output from the ratio adjustment circuit 15 is supplied to the integrator circuit 14 along with a sampling of the output signal from the logarithmic amplifier 10 that is supplied by the sampling network 16. The sampling network 16 samples the output signal Vout during the black reference interval of the input video signal. Thus, the logging transistor's 22 collector current is modulated based on the dc offset provided to the summing circuit 12 in addition to a current that is proportional to the input signal. This results in a nominal collector current even in the absence of an input video signal which in turn enhances temperature stability.

More importantly, however, the dc offset can be used as a variable to modify the log-offset compandor's transfer characteristic. Thus, the single log-offset compandor can generate an entire family of transfer curves. For example, a log curve and an offset log curve can be generated for use in telecine machines to scan different types of films, a gamma curve (Gamma=0.454) commonly used for gamma correction factors can be generated, a SMPTE compression curve recommended for use in video cameras can be generated, as well as a square root, L* and cube root curves. Thus, the log-offset compandor illustrated in FIG. 2 can be readily adapted for use in many video applications requiring signal companding including telecine machines, video cameras, as well as to provide gamma correction in video processing circuits.

Figure 3:
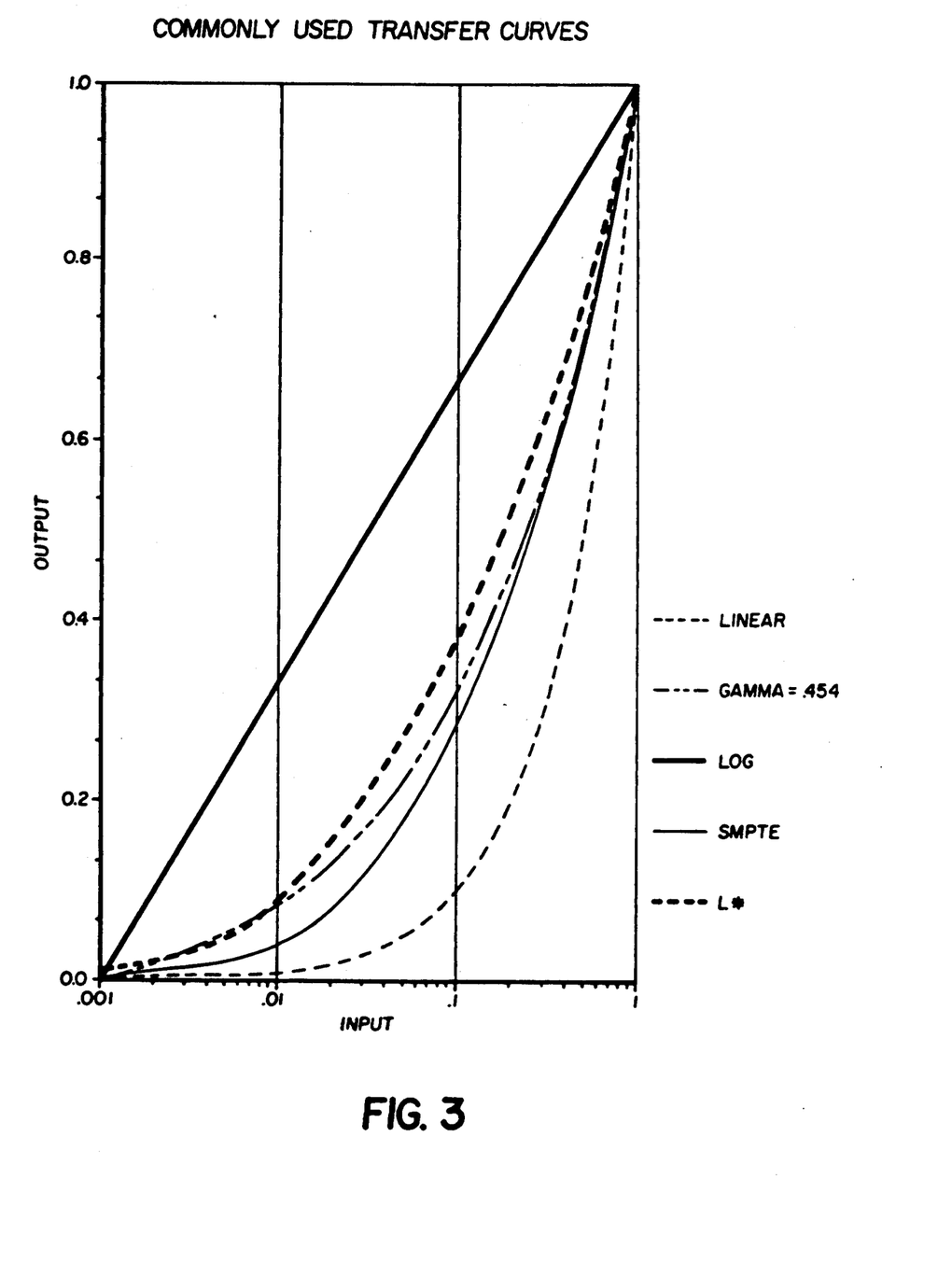
FIG. 3 illustrates commonly used transfer curves.
Figure 4:
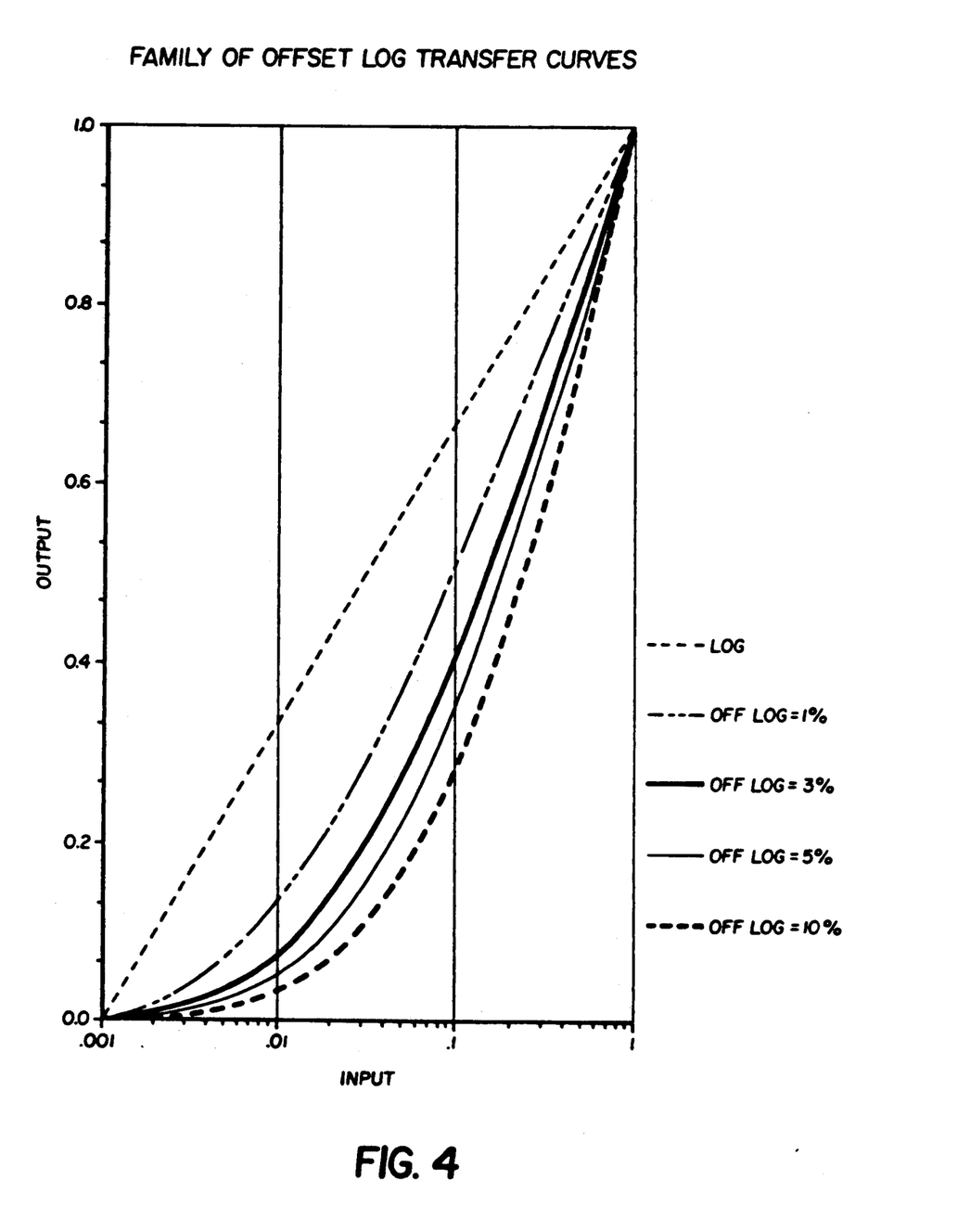
FIG. 4 illustrates the use of various offsets to approximate the curves illustrated in FIG. 3.
Figure 5:
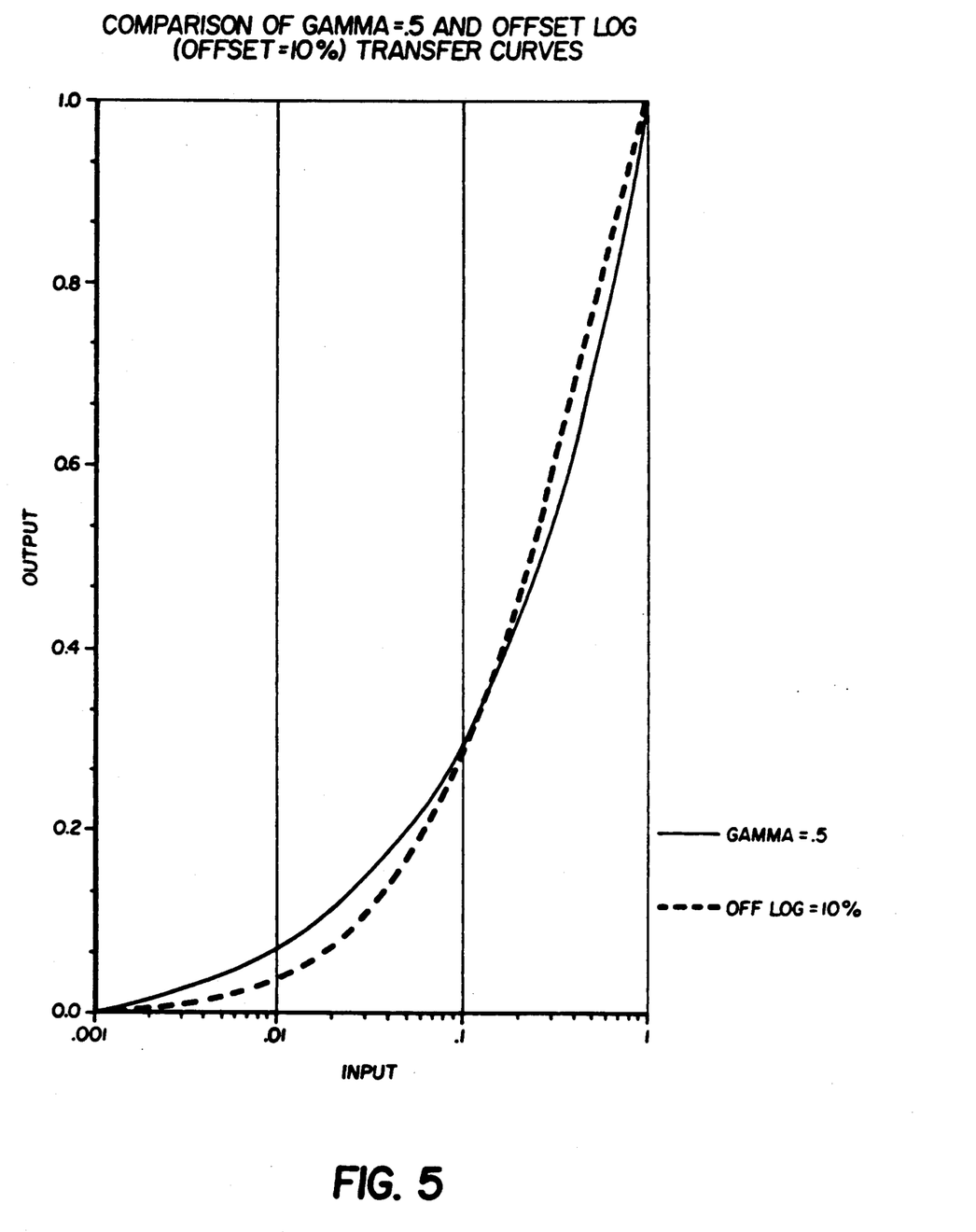
FIG. 5 is a graph showing the comparison of Gamma=0.5 and offset log (offset=10%) transfer curves.
Figure 6:
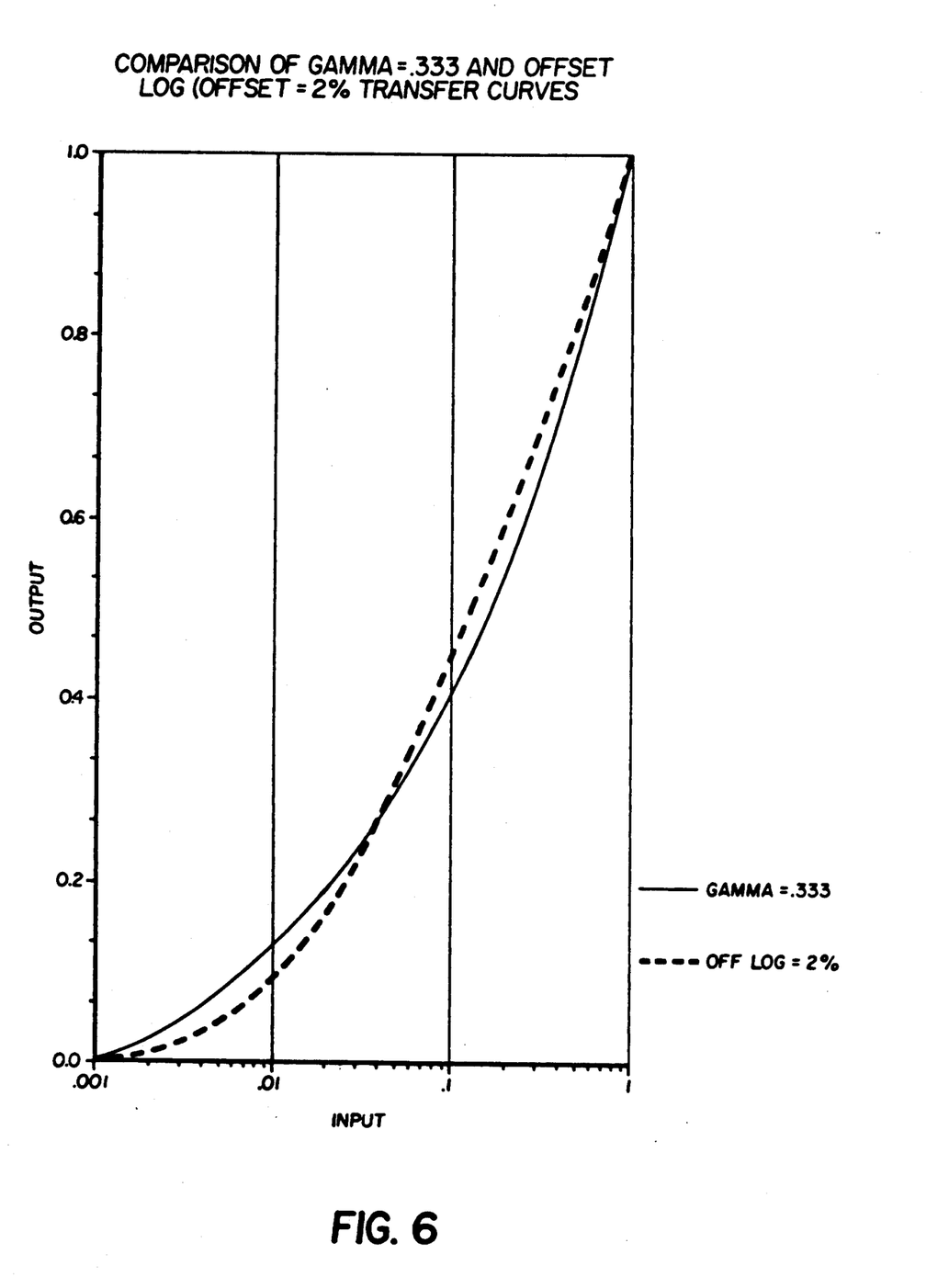
FIG. 6 is a graph showing the comparison of Gamma=0.333 and offset log (offset=2%) transfer curves.

The family of curves which may be generated is more clearly illustrated in FIGS. 3–6. FIG. 3 illustrated commonly used transfer curves, while FIG. 4 illustrates the use of various offsets to approximate the curves illustrated in FIG. 3. FIG. 5 is a graph showing the comparison of Gamma=b 0.5 and offset log (offset=10%) transfer curves. FIG. 6 is a graph showing the comparison of Gamma=0.333 and offset log (offset=2%) transfer curves.

The log-offset compandor in addition to having a variable transfer characteristic that can closely mimic other desirable transfer curves (for example: L*, SMPTE, GAMMA=0.454, and cube root) also has speed, stability and signal to noise advantages over log signal compandors. For example, logarithmic amplifiers have bandwidth or settling time problems at low signal levels. The Gummel plot of a transistor typically indicates five or more decades of logarithmic operation. However, once the collector current is decreased about two decades below its peak amplitude, the Ft of the transistor will decrease dramatically. This causes a signal dependent bandwidth which degrades rapidly below the second decade. In contrast, the log-offset compandor uses an offset to create its transfer characteristic. Thus, modulation of the logging transistor's collector current has a greatly reduced dynamic range. The net result is a significant speed improvement at low Vi input signal levels.

In addition, logarithmic compression results in quantization steps that are proportional to the input signal level. Thus, with no other noise sources in an overall system, the input referred signal to quantization noise ratio is independent of the input signal level. Linear quantization has an input referred signal to quantization noise that is directly dependent on the input signal level as the quantization step size is fixed. In contrast, log-offset compression is a cross between logarithmic and linear quantization. The amount of offset will trade off S/N (quantization) improvement, when compared with logarithmic compression, at high signal levels for degradation at low levels. Thus, log-offset compression takes advantage of the fact that the system S/N is dominated by sensor noise at low signal levels and by quantization noise at high signal levels.

Figure 7:
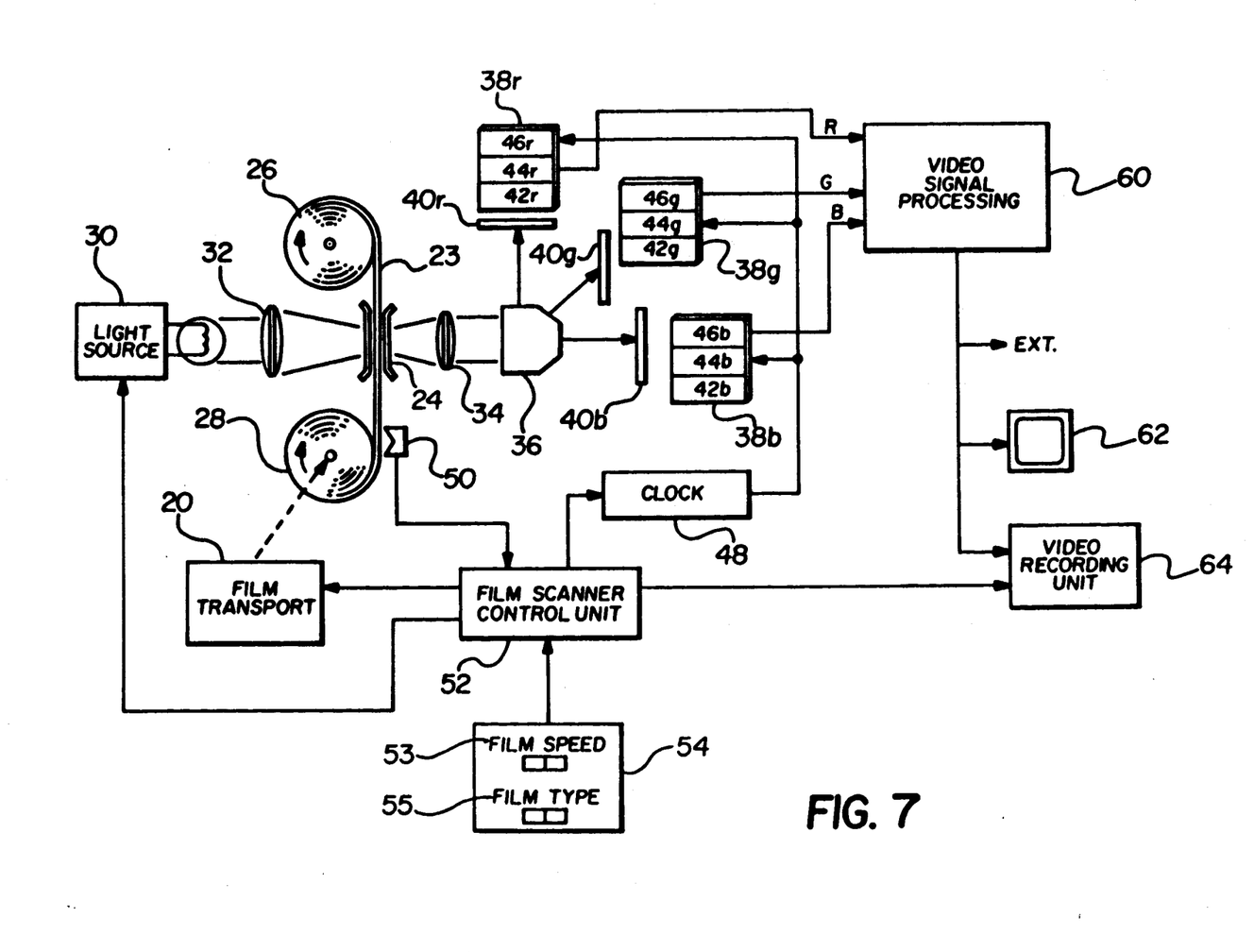
FIG. 7 is a schematic block diagram of a telecine machine incorporating the log-offset compandor illustrated in FIG. 2.

Referring now to FIG. 7, a telecine machine incorporating the log-offset companding circuit illustrated in FIG. 2 is shown including a film transport 20 that advances a motion picture film 23 at variable speeds through a film gate 24 from a supply reel 26 to a take-up reel 28. A light source 30 generates a light beam that is directed to a line converter 32 and focused upon a linear section of the film 23 in the film gate 24. The light is modulated by the image on the film 23 and is transmitted through an objective lens 34 to a beam splitter 36 that transmits the modulated light to each of three CCD line sensors 38r, 38g, 38b. Red, green and blue filters 40r, 40g, 40b are respectively provided in front of the CCD line sensors so that the output signals generated from the sensors correspond to the red, green and blue components of the modulated light. A film speed sensor 50 is provided to monitor the speed of the film as it passes through the film gate, and supplies a signal indicative thereof to a film scanner control unit 52. The film scanner control unit 52 is also coupled to an operator control panel 54 that includes a film transport speed control 53 and a film type control 55. Signals indicative of the desired film speed and film type are supplied by the operator control panel 54 to the film scanner control unit 52.

Each CCD line sensor 38r, 38g, 38b includes a linear array of active photosites 42r, 42g, 32b, a transfer gate 44r, 44g, 44b and a horizontal output shift register 46r, 46g, 46b. Image charge accumulated in the active photosites of the respective linear arrays is transferred to the respective horizontal output shift registers 46r, 46g, 46b by applying a gate signal to the respective transfer gate 44r, 44g, 44b. The sensor clock 48 provides the gate signal to the transfer gates 44r, 44g, 44b to effect charge transfer. In addition, the sensor clock generator 48 provides a clock signal of predetermined frequency for shifting the respective image signals from the horizontal output shift registers.

The output signals from the CCD sensors are supplied to a video signal processing circuit 60 which converts and formats the signals received from the sensors to a desired video signal format. The output signal from the video processing circuit is supplied to both a video recorder unit 64, a display monitor 62 and to any other external device desired.

Figure 8:
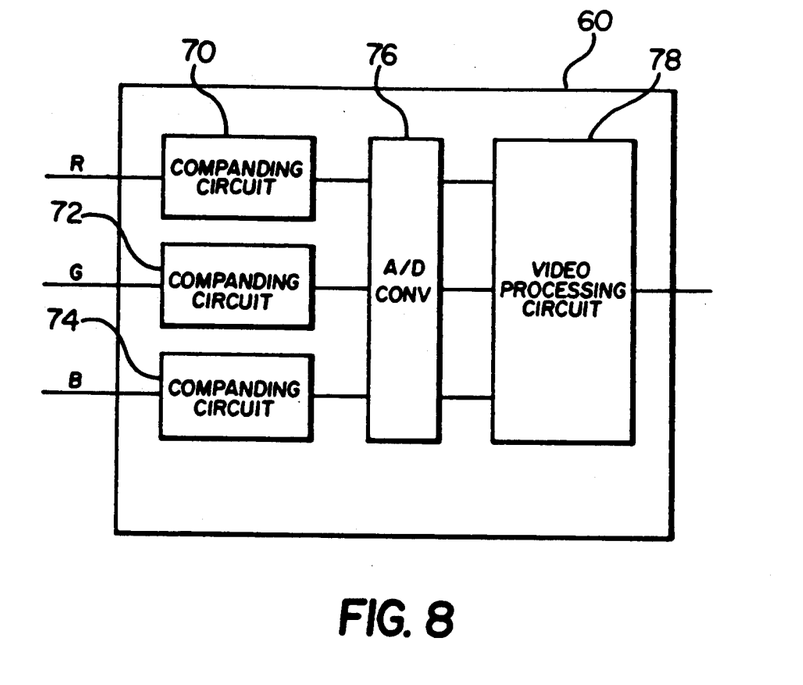
FIG. 8 is a schematic block diagram of the video signal processing circuitry of the telecine machine illustrated in FIG. 7.

A block diagram of the video signal processing circuit 60 is shown in FIG. 8. The processing circuit 60 includes three log-offset companding circuits 70–74 (of the type shown in FIG. 2) which receive the signals generated by the CCD line sensors 38r, 38g, 38b. The output from the companding circuits 70–74 are then supplied to an A/D converter unit 76. The output from the A/D converter unit 76 is subsequently supplied to additional video processing circuitry 78, for example gamma correction circuitry, chrominance matrix, etc., which generates the output video signal.

Each of the log-offset companding circuits 70–74 is coupled to the film scanner control unit 52. The film scanner control unit 52 sends a signal to the compression ratio adjustment circuit of each of the companding circuits 70–74 in order to select a desired transfer curve based on the type of film being scanned. For example, a log transfer curve can be used for negative film while an log-offset curve is used for print film.

Figure 9:
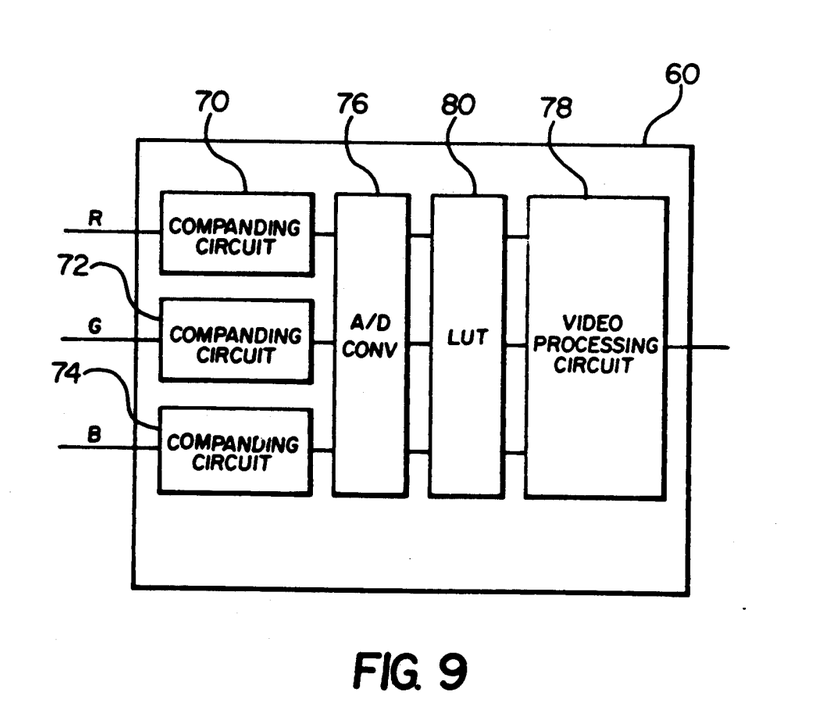
FIG. 9 is a schematic block diagram of the video signal processing circuitry illustrated in FIG. 8 with the addition of a look-up-table.

In some situations, it may be desirable to include a look-up-table (LUT) to translate the log-offset curve back to a log curve prior to the completion of signal processing. For example, as shown in FIG. 9, a LUT 80 is provided between the A/D converter unit 76 and the video processing circuitry 78. The LUT 80 converts the log-offset signal from the A/D converter unit 76 to a log signal which is then provided to the video processing circuitry 78. The use of the LUT 80 is of particular benefit when the video processing circuitry 78 is capable of handling only log data.

Although the invention is particularly applicable to HDTV telecine systems, it will be readily understood that the invention is not limited to that particular application or to the particular preferred embodiment described above. For example, the companding circuit can be used in video camera applications and the particular structure of the companding circuit may be varied, as well as the specific structure of the disclosed telecine machine. Modification and variations can readily be made within the scope of the appended claims.

What is claimed is:

1. A companding circuit comprising: a summing circuit; a logarithmic amplifier coupled to said summing circuit; and a feedback circuit, including a compression ratio adjustment circuit that generates a reference signal corresponding to a selected transfer curve, coupled to said summing circuit and an output of said logarithmic amplifier, wherein the feedback circuit generates an offset signal, based on said output of said logarithmic amplifier and a reference signal supplied by said compression ratio adjustment circuit, which is supplied to said summing circuit to generate the selected transfer curve.

2. A companding circuit as set forth in claim 1 wherein said feedback circuit further comprises a sampling network that samples said output of said logarithmic amplifier during a black reference level of an input video signal.

3. An apparatus comprising:
   a. transport means for transporting film through a film gate;
   b. illumination means for passing light through said film gate and focusing said light onto at least one light sensitive device that generates an output light signal;
   c. selection means for selecting the type of film to be transported through said film gate by said transport means and generating a film type signal indicative thereof;
   d. companding means for receiving said output light signal and said film type signal, and generating an output signal having a transfer curve that corresponds to said film type signal wherein said companding means includes a summing circuit, a logarithmic amplifier coupled to said summing circuit, and a feedback circuit coupled to said summing circuit and an output of said logarithmic amplifier, and wherein said feedback circuit includes a compression ratio adjustment circuit that generates a reference signal corresponding to a selected transfer curve in response to said film type signal; and e. processing means for receiving said output signal generated by said companding means and producing a video output signal.

4. An apparatus as claimed in claim 3, wherein said video processing means includes an A/D converter unit for converting said output signal generated by said companding means into a digital signal.

5. An apparatus as claimed in claim 4, wherein said video processing means further includes a look-up-table coupled to said A/D converter unit.

6. A method of operating a telecine machine comprising:
   a. transporting film through a film gate with a film transport mechanism;
   b. passing light through said film gate and focusing said light onto at least one light sensitive device that generates an output light signal;
   c. selecting the type of film to be transported through said film gate by said transport mechanism and generating a film type signal indicative thereof;
   d. supplying said output light signal and said film type signal to a signal companding unit including a summing circuit, a logarithmic amplifier coupled to said summing circuit, and a feedback circuit that includes a compression ratio adjustment circuit which generates a reference signal corresponding to a transfer curve that corresponds to said film type signal; and
   e. generating an output signal with said summing circuit based on an output of said logarithmic amplifier and said reference signal and supplying the output signal of said companding unit to a processing unit and producing a video output signal.

* * * * *